(12) United States Patent
Hosch et al.

(10) Patent No.: US 10,737,887 B2
(45) Date of Patent: Aug. 11, 2020

(54) ZONED ROLLER CONVEYOR

(71) Applicant: Dorner Mfg. Corp, Hartland, WI (US)

(72) Inventors: Michael Hosch, Oconomowoc, WI (US); Cham Chin Long, Nibong Tebal (MY)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 15/979,705

(22) Filed: May 15, 2018

(65) Prior Publication Data

US 2018/0327195 A1 Nov. 15, 2018

Related U.S. Application Data

(60) Provisional application No. 62/506,150, filed on May 15, 2017.

(51) Int. Cl.
| | |
|---|---|
| *B65G 47/31* | (2006.01) |
| *B65G 43/10* | (2006.01) |
| *B65G 39/10* | (2006.01) |
| *B65G 13/073* | (2006.01) |

(52) U.S. Cl.
CPC .......... *B65G 47/31* (2013.01); *B65G 13/073* (2013.01); *B65G 39/10* (2013.01); *B65G 43/10* (2013.01)

(58) Field of Classification Search
CPC ...... B65G 47/31; B65G 13/073; B65G 39/10; B65G 43/10
USPC ........................................................ 198/791
See application file for complete search history.

(56) References Cited

U.S. PATENT DOCUMENTS

| | | | | |
|---|---|---|---|---|
| 2,448,514 A | * | 9/1948 | Butler | C21D 1/74 165/120 |
| 3,374,877 A | * | 3/1968 | Kornylak | B65G 13/07 198/791 |
| 6,158,574 A | | 12/2000 | Williams et al. | |
| 6,460,690 B1 | * | 10/2002 | Tachibana | B65G 13/04 198/791 |

(Continued)

FOREIGN PATENT DOCUMENTS

| | | |
|---|---|---|
| KR | 20110045929 A | 5/2011 |
| WO | 0138205 A1 | 5/2001 |
| WO | 2012154650 A1 | 11/2012 |

OTHER PUBLICATIONS

Extended European Search Report for European Patent Application No. 18172305.7 dated Oct. 24, 2018.

*Primary Examiner* — William R Harp
(74) *Attorney, Agent, or Firm* — Andrus Intellectual Property Law, LLP

(57) ABSTRACT

A zoned roller conveyor is shown and described for moving a product between upstream and downstream ends of the conveyor. The zoned roller conveyor includes first and second side rails that are spaced from each other to define the conveyor width. A series of driven support rollers are spaced from each other within the conveyor zone. A drive motor is coupled to the support rollers such that the operation of the drive motor can be used to control the rotation of the support rollers in either a first or a second direction. A plurality of conveyor zones can be formed along the length of the conveyor frame where each conveyor zone is separately controlled by a drive motor. A motor controller is used to control the operation of each drive motor to transfer the product between conveyor zones and to control the movement of the product within each of the conveyor zones.

10 Claims, 9 Drawing Sheets

(56) References Cited

U.S. PATENT DOCUMENTS

2012/0175223 A1 7/2012 Breen et al.
2012/0290126 A1* 11/2012 Combs .................. B65G 43/10
          700/230

* cited by examiner

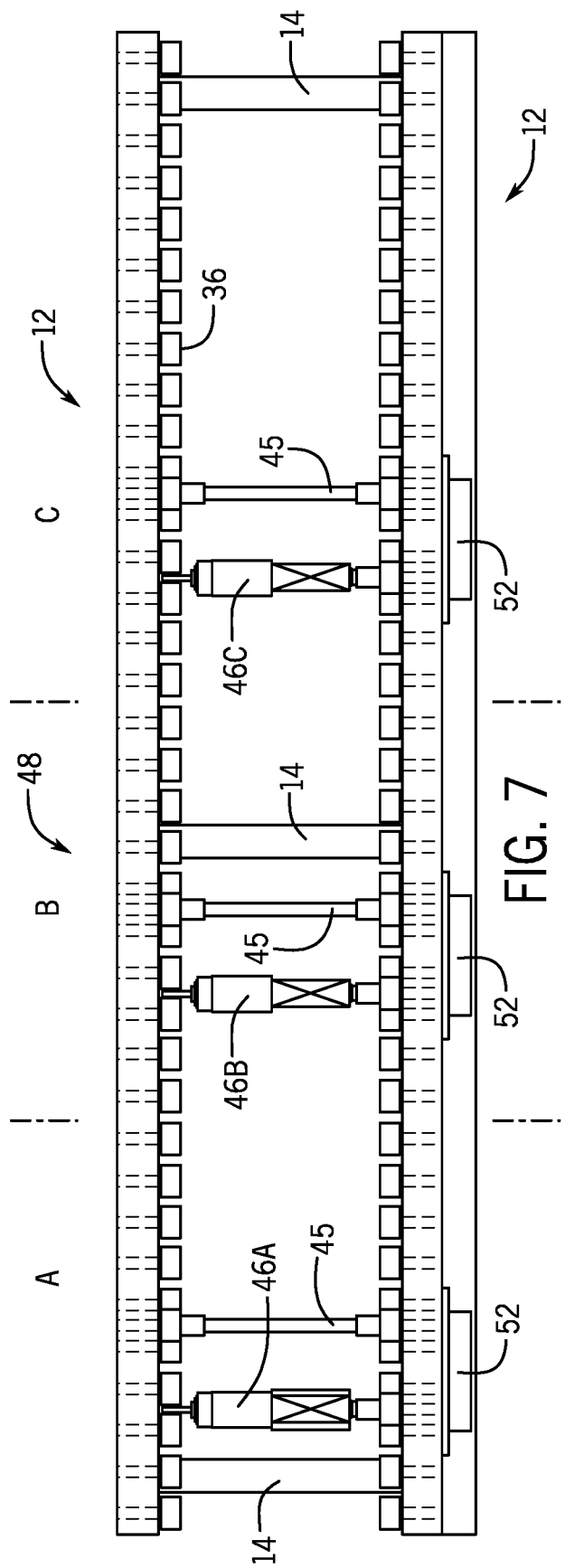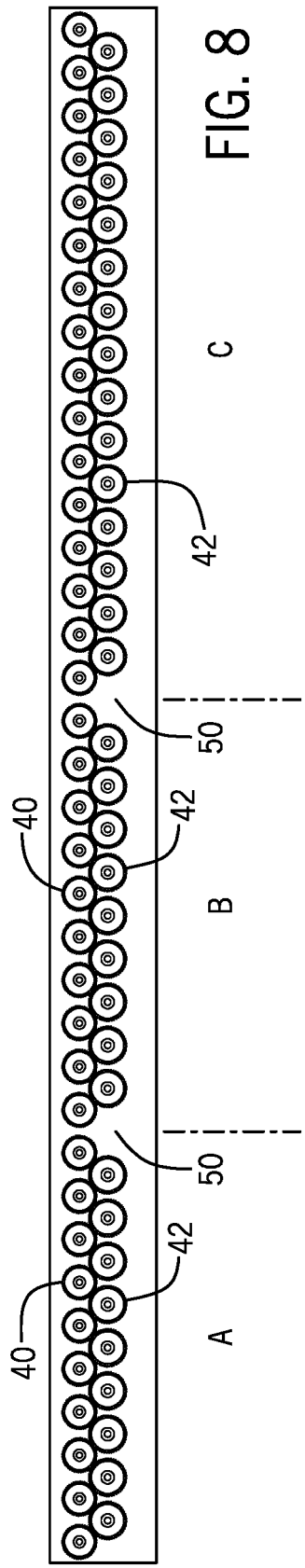

ZONED ROLLER CONVEYOR

CROSS REFERENCE TO RELATED APPLICATION

The present application is based on and claims priority to U.S. Provisional Patent Application Ser. No. 62/506,150, filed on May 15, 2017, the disclosure of which is incorporated herein by reference.

BACKGROUND

The present disclosure generally relates to roller conveyors. More specifically, the present disclosure relates to a roller conveyor that includes a plurality of zoned sections that allow for separate and independent operative control of the rollers in each of the zone sections.

Roller conveyors have been available for use in moving products from one desired location to another. Typically, roller conveyors include a drive motor that rotates at least one drive gear. The powered drive gear is intermeshed with a series of support rollers through a series of gear to rotate the support rollers and move a product through the conveyor assembly. Although roller conveyors have been known for some time, it is desirable to improve the operation of a standard roller conveyor to provide increased functionality.

SUMMARY

The present disclosure relates to a roller conveyor for use in moving a product or products along the length of the conveyor. More specifically, the present disclosure relates to a zoned roller conveyor that includes a plurality of conveyor zones that can be independently controlled.

The zoned roller conveyor of the present disclosure extends from an upstream end to a downstream end and includes a conveyor frame having a pair of spaced side rails. The zoned roller conveyor includes a plurality of conveyor zones where each of the conveyor zones includes a plurality of support rollers that are rotatable in both a first and a second direction to cause the product to move in either a first direction or a second direction within the conveyor zone. Each of the conveyor zones includes a drive motor that is operable to rotate the plurality of support rollers within the conveyor zone in either of the first and second directions. The direction of operation of the drive motor thus controls the direction of product movement within the conveyor zone.

In accordance with one embodiment of the disclosure, each of the support rollers is mounted to a shaft where the shaft is rotatable with respect to one of the side rails. An upper gear is securely mounted to the shaft such that the support roller and upper gear rotate along with rotation of the support shaft. The series of support rollers and upper gears are spaced along the length of the side rail such that the support rollers and upper gears do not contact each other.

Each conveyor zone of the roller conveyor includes a series of lower, linking gears that are positioned beneath the upper gears and spaced such that the teeth formed on the lower linking gears mesh with corresponding teeth formed on the upper gears. In this manner, the lower linking gears provide a rotational link between a pair of adjacent upper gears.

One of the lower linking gears is directly coupled to the drive motor for the conveyor zone. When the drive motor is operated in either the first or second direction, the rotation of the drive motor is transferred to the connected linking gear to cause rotation of the linking gear. The meshed interconnections between the lower linking gear and a pair of upper gears results in the rotation of the driven lower linking gear causing rotation of all of the upper gears and associated support rollers within the conveyor zone.

The lower linking gears and upper gears of each conveyor zone are independent from the upper gears and lower linking gears of the adjacent conveyor zone such that the support rollers in a first conveyor zone rotate independently from the support rollers in a second conveyor zone. In this manner, the drive motors of the first and second conveyor zones independently control the movement of a product within the specific conveyor zone. Products can be transferred from one conveyor zone to the next conveyor zone as a result of the consistent spacing between the support rollers across adjacent conveyor zones.

In an embodiment of the zoned roller conveyor having a plurality of conveyor zones, the drive motors within each of the conveyor zones can be either separately controlled by separate motor controllers or individual motor controllers can be configured to control the drive motors of more than one conveyor zone. The motor controllers are preferably linked to each other such that the drive motors in the plurality of conveyor zones can be used to move a product between the conveyor zones yet independently control the movement of the product within each of the conveyor zones.

BRIEF DESCRIPTION OF THE DRAWINGS

The drawings illustrate the best mode presently contemplated of carrying out the disclosure. In the drawings:

FIG. 7 is a top view of a multi-section zoned roller conveyor showing the location of multiple drive motors;

FIG. 8 is a side view of the multi-section zoned roller conveyor of FIG. 7;

DETAILED DESCRIPTION

Figure 1:
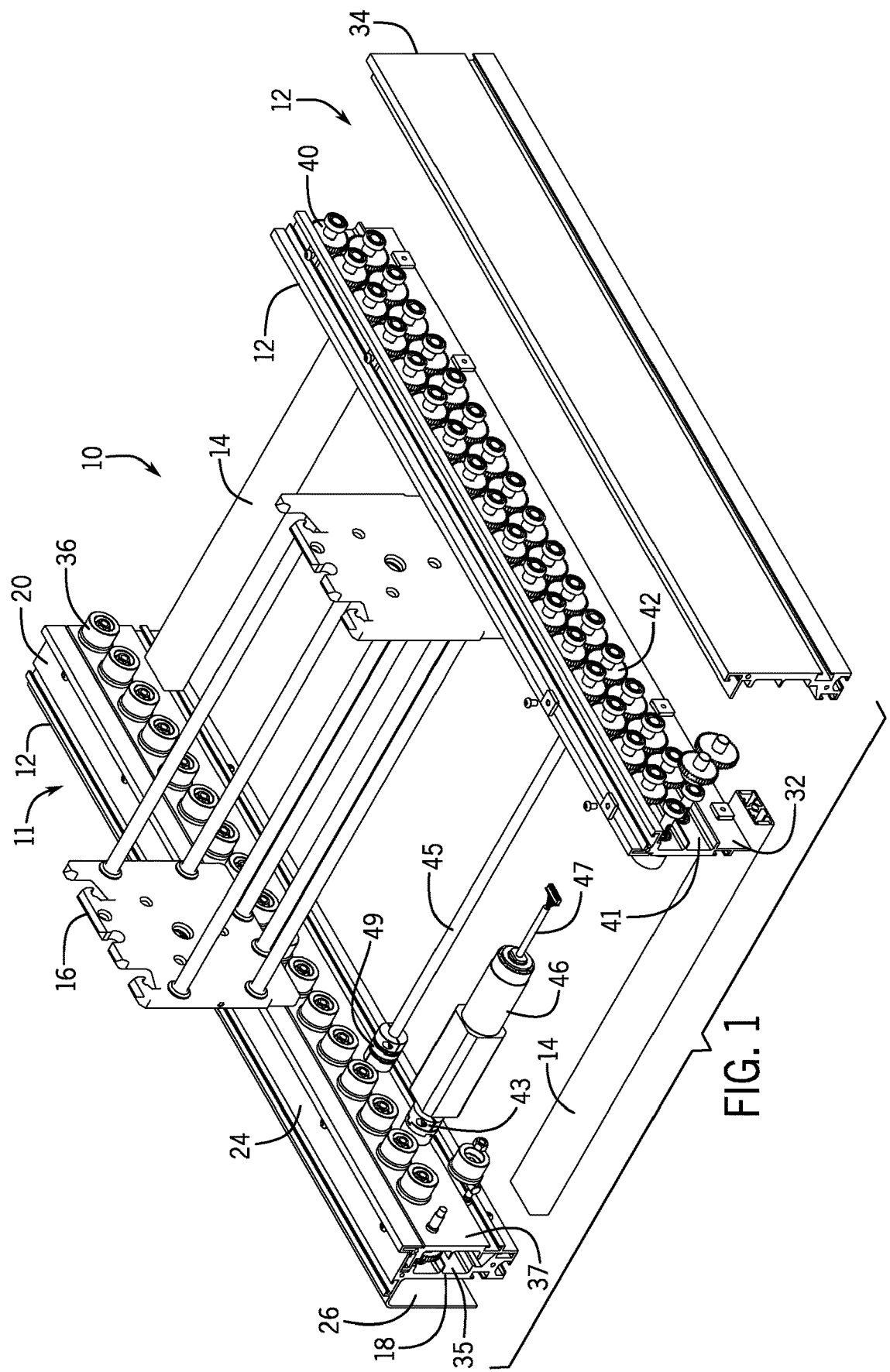
FIG. 1 is perspective view of one section of a roller conveyor of the present disclosure.
Figure 2:
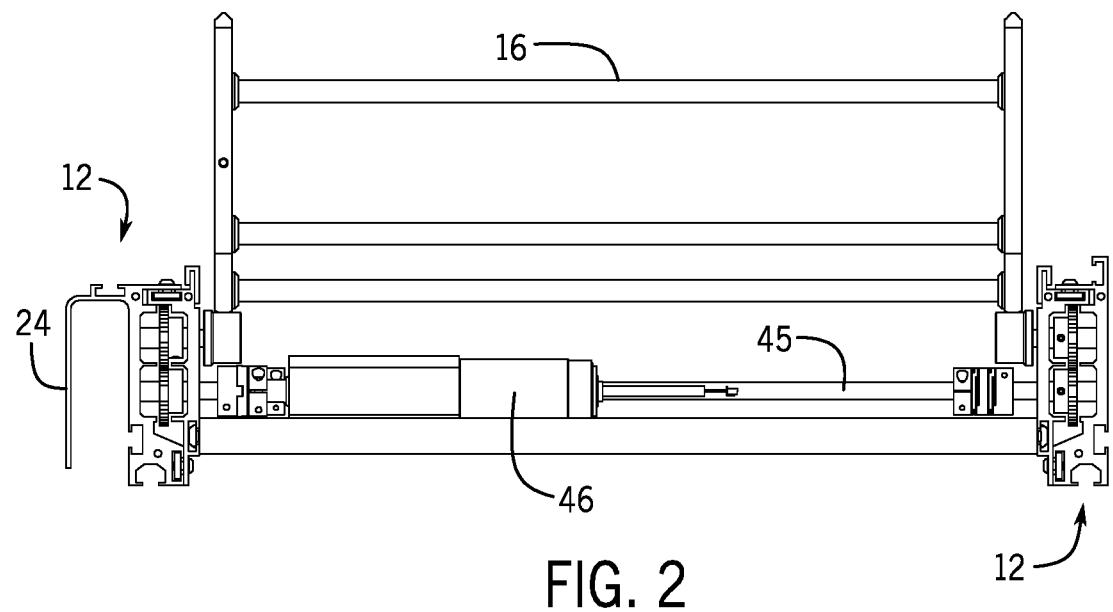
FIG. 2 is an end view of the roller conveyor shown in FIG. 1.
Figure 3:
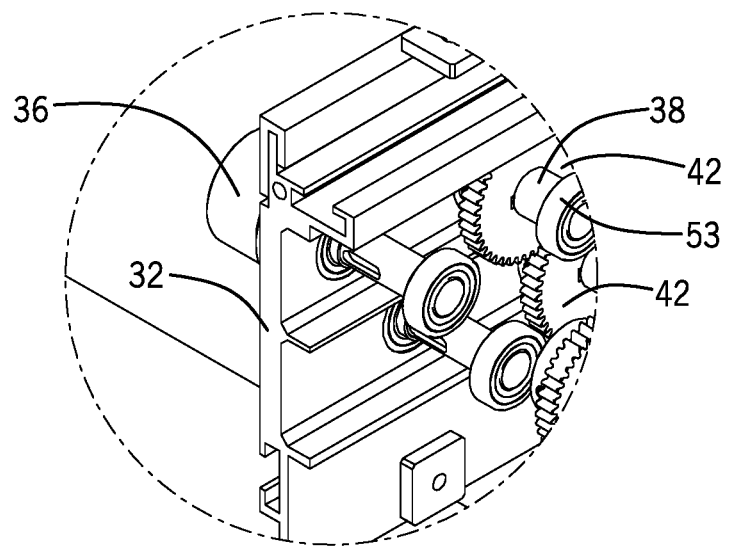
FIG. 3 is a magnified view of one end of the roller conveyor.

Referring first to FIG. 1, thereshown is a section of a roller conveyor 10 constructed in accordance with one embodiment of the present disclosure. The roller conveyor section 10 includes a conveyor frame 11 that includes a pair of side rails 12 that are spaced and supported relative to each other by a series of cross supports 14. The cross supports 14 define the width of the section of the roller conveyor 10. In the embodiment illustrated, the roller conveyor 10 is used to move a product 16 from an upstream end 18 to a downstream end 20 of the conveyor frame 11. The distance between the upstream end 18 and the downstream end 20 can greatly vary depending upon the particular application for the roller conveyor 10. In the embodiment shown, the product 16 is a carrier for supporting a series of battery wafers. However, the product 16 could be any different type of device that needs to be moved along the length of the roller conveyor 10. In addition, the roller conveyor 10 could be used to move the actual product along the length of the roller conveyor 10 without the need for the product carrier.

Figure 6:
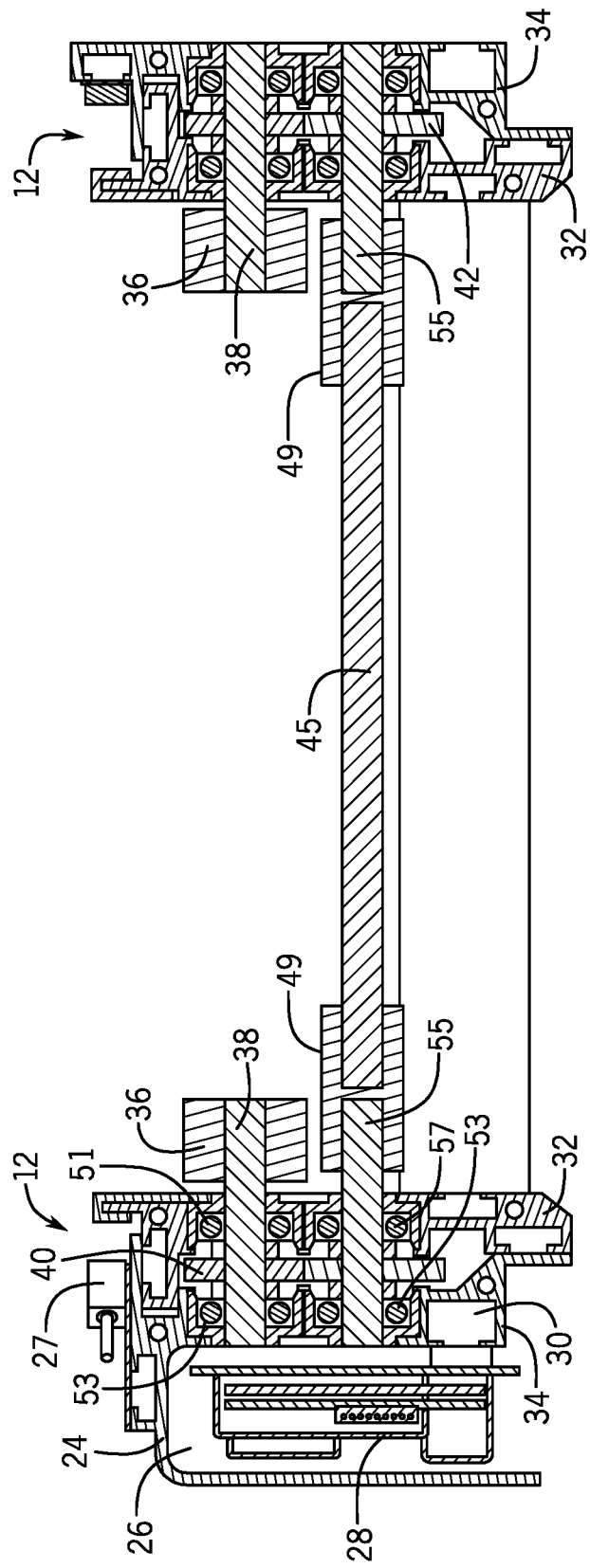
FIG. 6 is an end view of the roller conveyor.

In the embodiment shown in FIG. 1, one of the side rails 12 includes a protective extrusion 24. As shown in FIG. 6, each of the side rails 12 is formed from the combination of an inner extrusion 32 and an outer extrusion 34 that are joined to each other to form the side rail 12. The protective extrusion 24 is mounted to the outer extrusion 34 and includes an open cavity 26 that can receive one or more control boards 28 that include the electrical components for operating the conveyor in the manner that will be discussed below. A low voltage wireway 30 is also created by the outer extrusion 34. The inner extrusion 32 and the outer extrusion 34 combine to form each of the side rails 12 and create an open gear cavity 35 (FIG. 1) that protects and encloses the series of gears used to rotate the support rollers 36. In addition, the side rails provide a secure location for mounting other components, such as the product sensor 27. The inner and outer extrusions 32, 34 are each formed from an extruded aluminum, which provides the required strength and relatively low weight.

Figure 4:
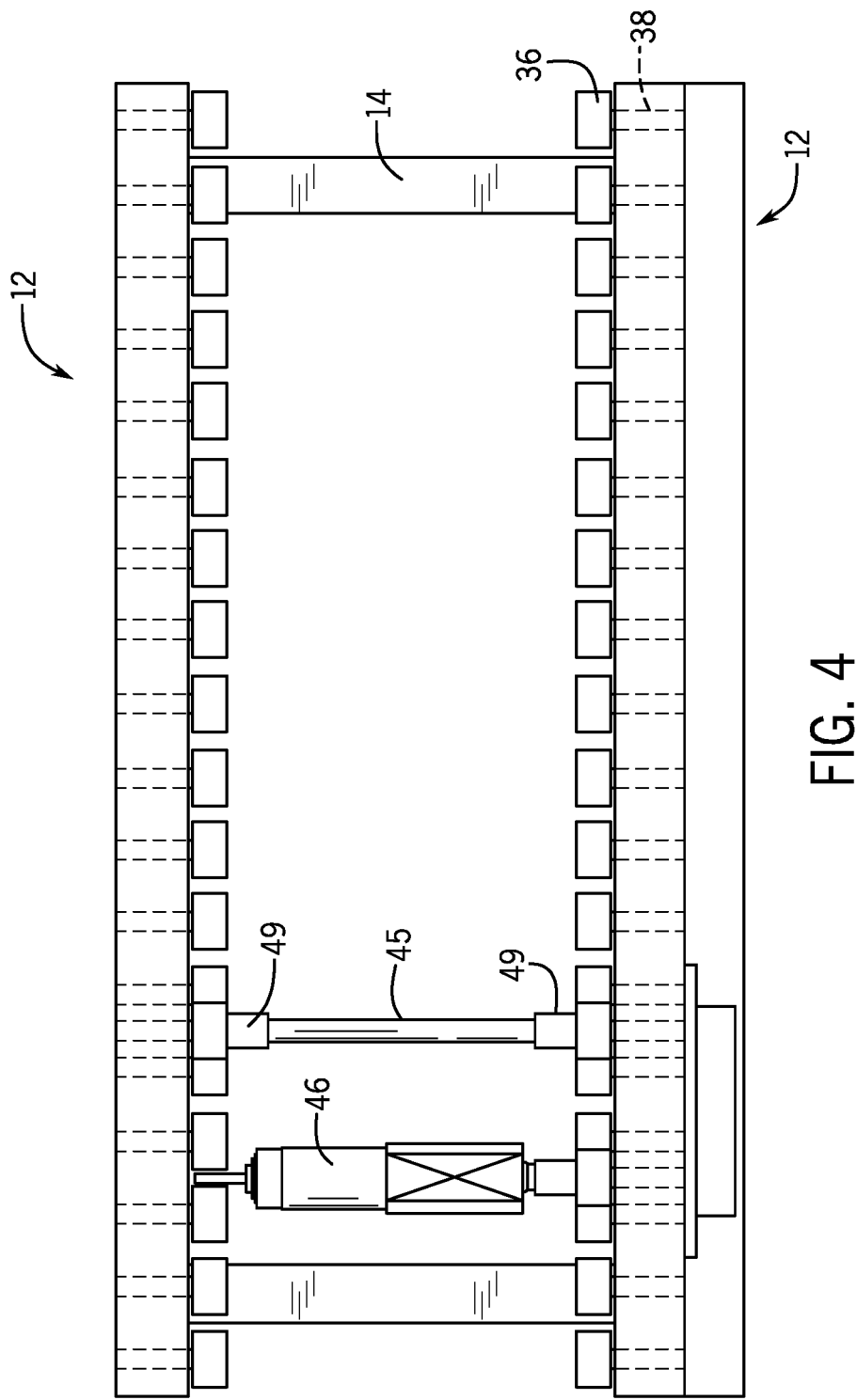
FIG. 4 is a top view of the roller conveyor showing the spacing of the series of support rollers and the location of the drive motor.

Referring back to FIG. 1, both of the side rails 12 support a series of support rollers 36 that are mounted along an inner face 37 and are equally spaced along the length of one of the side rails 12. The support rollers 36 provide the required support for the product 16 as the product moves along the length of the roller conveyor. As illustrated in FIG. 4, each of the support rollers 36 is securely mounted to a support shaft 38 for rotation with the shaft 38. In the embodiment shown, each of the rollers is 1½ inches in diameter and the support shafts 38 are spaced from each other on two inch centers. Such spacing leaves a slight gap between the outer diameter of each of the adjacent support rollers 36 such that the support rollers 36 do not contact each other. Although a specific outer diameter and spacing is shown and described, other spacing could be utilized depending on the configuration of the roller conveyor.

Figure 5:
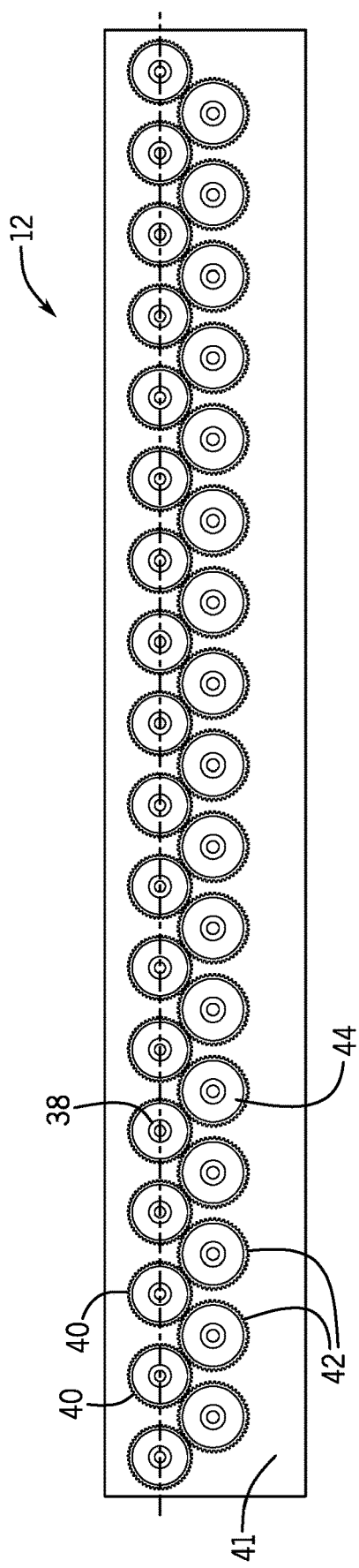
FIG. 5 is a side view showing the intermeshing between the upper gears and the lower linking gears.

As shown in FIGS. 1 and 5, each of the support shafts 38 is securely joined to an upper gear 40 such that the support shaft 38 and support roller 36 rotates with the upper gear 40. The upper gears 40 are located along an outer face 41 of one of the side rails 12 and are contained in the gear cavity 35 formed by the joined extrusions 32 and 34. The upper gears 40 each include a series of spaced teeth and are spaced from each other such that the upper gears 40 do not directly interact with each other.

A series of lower linking gears 42 are also positioned within the gear cavity 35 and are located below the upper gears 40. Each of the lower linking gears 42 includes a series of teeth that intermesh with the teeth on at least one of the upper gears 40. In the embodiment shown, each of the lower linking gears 42 intermeshes with two of the upper gears 40. In this manner, rotation of one of the support rollers 36 and the associated upper gear 40 is transferred to the adjacent upper gear 40 through the interaction with the lower linking gear 42.

Referring back to FIG. 1, an electric driver motor 46 is positioned within the open interior of the conveyor frame 11 and has a drive shaft connected to one of the lower linking gears 42 supported on one of the spaced side rails 12. In the embodiment shown, the drive motor 46 is a brushless DC motor that can be operated in both a forward direction and a reverse direction.

In the embodiment shown in FIG. 5, one of the lower linking gears 42 is connected to the drive motor through a coupling 43 and becomes a driven gear 44 for the conveyor section. When the driven gear 44 rotates in either a first or an opposite second direction due to operation of the drive motor 46, the driven gear 44 causes each of the upper gears 40 in direct contact with the driven gear 44 to rotate through the meshed interaction between the gears. The rotation is further transferred to the remaining series of lower linking gears 42 and upper gears 40 through the meshed interconnections between the series of gears. Each of the upper gears 40 is securely attached to one of the shafts 38, which in turn is connected to one of the support rollers 36. In this manner, operation of the drive motor 46 causes each of the support rollers 36 to rotate in the direction of rotation of the drive motor. Through the meshed interaction between the upper gears 40 and lower linking gears 42, the drive motor 46 can cause the product 16 to move in either direction along the length of the roller conveyor 10.

Referring back now to FIG. 1, the drive motor 46 is shown connected to the lower linking gears 42 positioned on one side (left side) of the conveyor 10. Thus, the lower linking gears 42 and intermeshed upper gears 40 on the left side of the conveyor 10 are positively driven by the drive motor. The operation of the drive motor 46 is controlled through a control cable 47 and an associated motor controller.

In the embodiment shown in FIGS. 1 and 6, a connecting rod 45 extends across the interior of the conveyor frame 11. The connecting rod 45 includes a coupling 49 formed on each end such that the connecting rod 45 provides a direct rotational link between one of the lower linking gears 42 on the left side of the conveyor frame 11 to a corresponding lower linking gear 42 on the opposite, right side of the conveyor frame 11. In this manner, the rotation of the lower linking gears 42 on one side of the conveyor frame 11 are transferred to cause rotation of the corresponding lower linking gears on the opposite side of the conveyor frame.

As illustrated in FIG. 6, each of the support rollers 36 is mounted to the support shaft 38 and the support shaft 38 and associated upper gear 40 are rotatably supported relative to the side rail 12 by an inner bearing 51 and an outer bearing 53. The linking gear 42 is mounted to a similar support shaft that is also rotatably supported by an inner bearing 51 and an outer bearing 53. As can be seen in FIG. 6, the connecting rod 45 provides a direct connection between a similar support shaft 55 that extends through the inner face of the side rail to transfer rotation between the lower linking gears 42. In this manner, the driven rotational movement of one of the lower linking gears 42 is transferred to the opposite side of the conveyor frame.

In the embodiment shown in FIGS. 1-6, the conveyor frame includes a single series of lower linking gears 42 and upper gears 40 that all rotate in the same direction, which is controlled by the operation of the drive motor 46. The direction of rotation of the drive motor 46 thus controls the direction of movement of the product 16 along the length of the conveyor. However, multiple zones of the upper gears 40 and lower linking gears 42 can be positioned adjacent to each other to create a zoned roller conveyor, as will be discussed in greater detail below.

FIGS. 7 and 8 illustrate a zoned roller conveyor 48 constructed in accordance with the present disclosure. The zoned roller conveyor 48 includes a similar pair of side rails 12 that each provides support for a series of support rollers 36. The rotation of the support rollers 36 allow a product to move from the upstream end of the conveyor 48 to the downstream end while being controlled over the entire length of the conveyor 48. However, in the embodiment shown in FIGS. 7 and 8, the zoned roller conveyor 48 is divided into multiple, independently controlled conveyor zones such that product movement can be controlled in each of the conveyor zones. In the embodiment shown in FIG. 8, the zoned roller conveyor 48 includes three independent zones, labeled by reference characters A, B and C. In order to create the zoned roller conveyor 48, several of the individual lower linking gears 42 are removed to create a gap 50 between the zones. The gaps 50 isolate each of the zones such that rotation of the lower linking gears 42 in zone A is not transferred to the upper gears 40 and thus the lower linking gears 42 contained in zone B Likewise, rotation of the lower linking gears 42 in zone B is not transferred to the upper gears 40 or lower linking gears in either zone A or zone C. In the embodiment shown in FIGS. 7 and 8, each of the zones includes a separate drive motor 46A, 46B and 46C and a separate connecting rod 45. Each of the individual drive motors 46A-46C is separately controlled such that the three drive motors can be operated at different times and in different directions. In the embodiment shown, each of the drive motors 46A-46C is operated by a separate motor controller 52.

In addition to the embodiment shown in FIGS. 7 and 8, an alternate embodiment is contemplated in which each pair of the separate support rollers 36 located along each of the spaced side rails 12 could be replaced by a continuous roller that would extend across the interior of the conveyor frame. Such embodiment would eliminate the need for the connection rod 45 in each of the conveyor zones. Such embodiment would also eliminate the need for the lower linking gears 42 on the side of the conveyor frame opposite the lower linking gear driven by the drive motor 46 of the conveyor zone. In this embodiment, each conveyor zone would still be separately controlled and driven by one of the drive motors 46 such that product movement would be separately controlled in each of the conveyor zones and the product could be transferred between the separate zones.

In the alternate embodiment described above, the series of continuous rollers could be used either alone or in combination with a conveyor belt. In such an embodiment, the conveyor belt in each zone would extend between the most upstream and most downstream continuous roller in the conveyor zone. The use of a conveyor belt would aid in controlling the movement of the product in the conveyor zone and may eliminate the need for the lower linking gears. Once again, in this embodiment, each conveyor zone would still be separately controlled and driven by one of the drive motors 46 such that product movement would be separately controlled in each of the conveyor zones and the product could be transferred between the separate zones.

Figure 10:
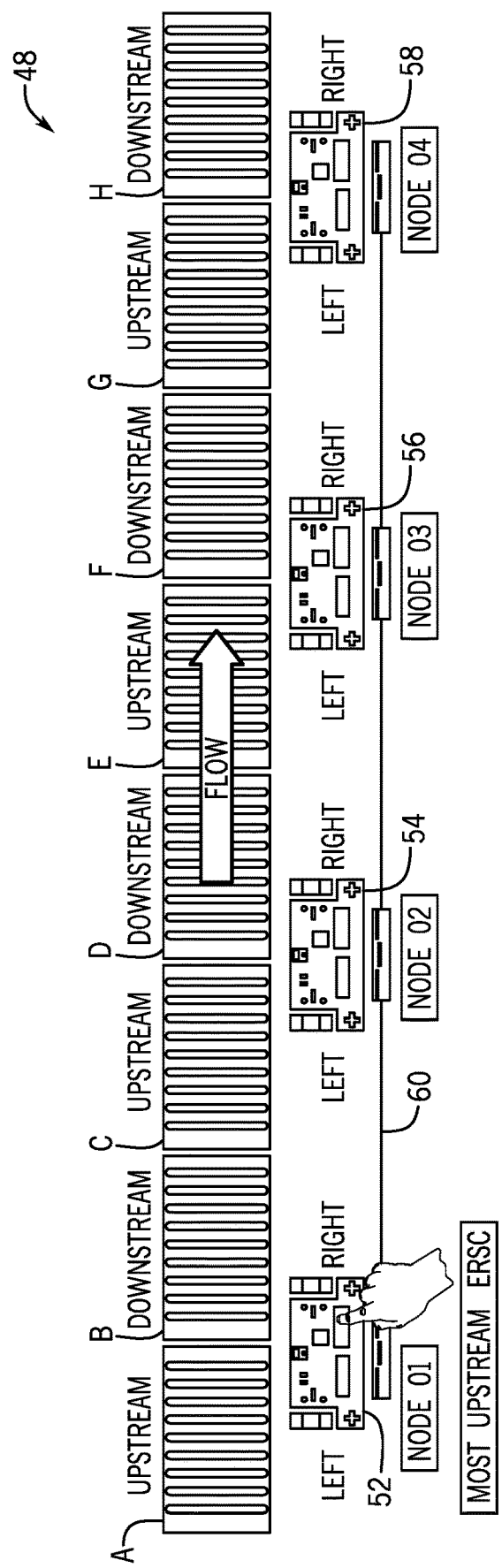
FIG. 10 is a schematic layout illustration for the multi-section zoned roller conveyor.

Referring now to FIG. 10, the zoned roller conveyor 48 is shown having eight individual conveyor zones labeled by reference characters A-H. The first two conveyor zones A, B are controlled by a first motor controller 52. The second pair of conveyor zones C, D are controlled by a second motor controller 54. The next two conveyor zones E, F are controlled by a third motor controller 56 while the last two conveyor zones G, H are controlled by a motor controller 58. Each of the motor controllers 52-58 is able to separately control an upstream conveyor zone and a downstream conveyor zone. These conveyor zones are referred to as an upstream zone and a downstream zone relative to the general direction of the product movement. Each of the conveyor zones A-H includes a separate drive motor (not shown) such that each of the individual motor controllers 52-58 can independently control the operation of two drive motors. However, the roller conveyor could be configured such that each motor controller controls only one motor or more than two motors. The motor controllers communicate with each other along an Ethernet cable 60 such that the motor controllers can work together to control product movement along the length of the zoned roller conveyor.

Figure 9:
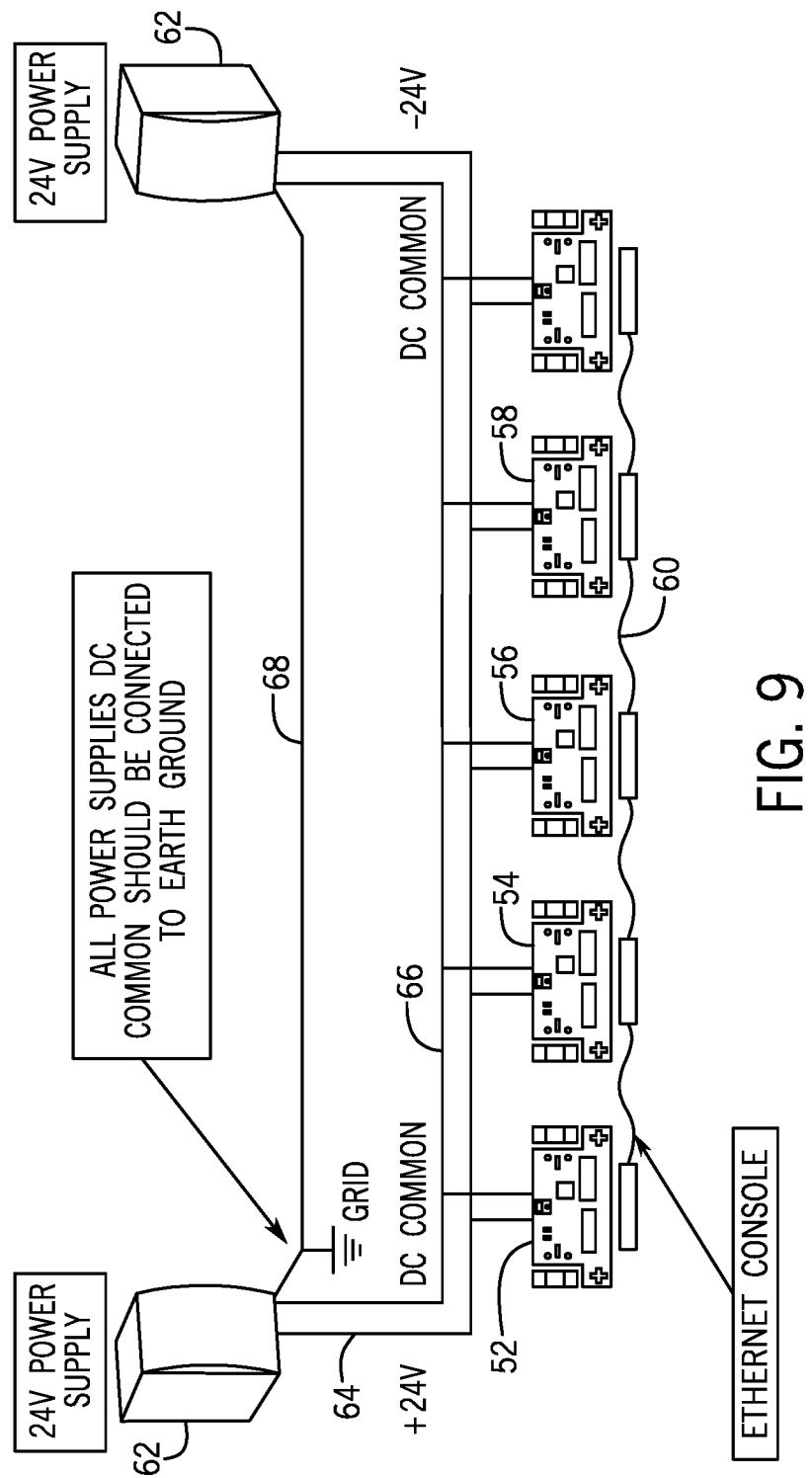
FIG. 9 is an schematic illustration of the electrical connections and controls for the multi-section zoned roller conveyor.

In the embodiment shown in FIG. 9, a pair of twenty-four volt power supplies 62 provides a twenty-four volt power supply along line 64. The twenty-four volt power supply along line 64 is used to operate the individual drive motors. A DC common voltage line 66 is used to provide power to the motor controllers, as is well known. A ground line 68 connects the power supplies and provides a common ground for the electrical components.

Figure 11:
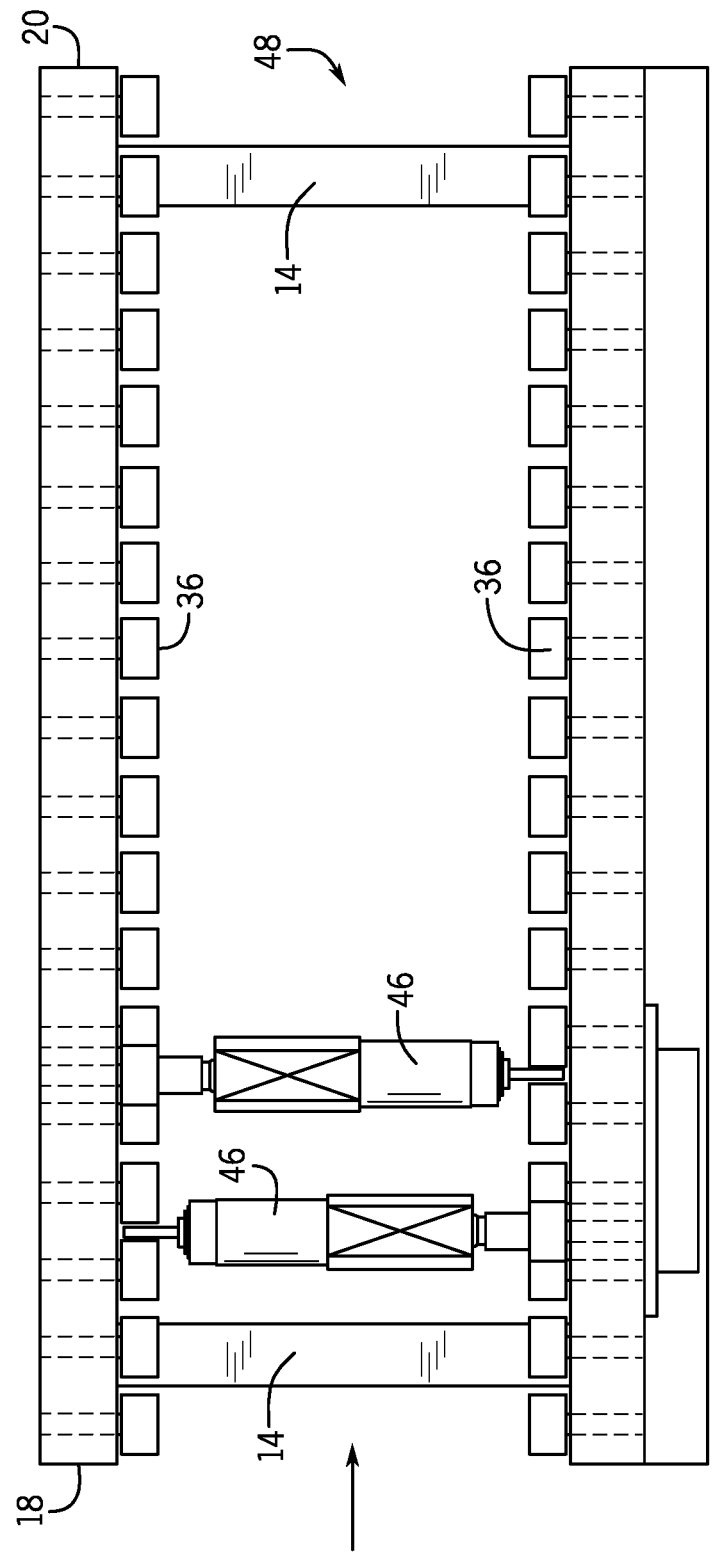
FIG. 11 is a top view of an alternate configuration for a zoned roller conveyor including an increased drive system.

FIG. 11 illustrates an embodiment in which heavy articles are being moved by the zoned roller conveyor 48. In this embodiment, a pair of drive motors 46 is located in a single zone to increase the amount of power used to drive the rollers 36. In the embodiment shown in FIG. 11, each of the drive motors 46 are oriented in opposite directions. In this manner, the first drive motor positively drives the support rollers 36 on one side of the roller conveyor 48 while the second, downstream drive motor is oriented in the opposite direction to positively drive the support rollers on the opposite side of the conveyor. The opposite orientation of the pair of drive motors 46 thus eliminates the need for the connecting rod to transfer rotational movement from one side of the conveyor frame to the opposite side of the conveyor frame. Each of the pair of drive motors 46 could be controlled by a common motor controller such that the drive motors 46 would operate at the same speed. It is important that the pair of drive motors 46 operate at the same speed to allow the product to move smoothly between the upstream end 18 and the downstream end 20 of the conveyor frame. Alternatively, a single, larger drive motor could be utilized in place of the pair of drive motors 46. However, it has been found that utilizing two smaller motors 46 is often more cost efficient than utilizing a larger motor since the two smaller motors 46 spread the drive forces among two driven gears, rather than applying all of the forces to a single drive gear. A single drive gear would need to be of a different strength to handle all of the drive forces.

As shown and described in the drawing figures, the present disclosure creates multiple conveyor zones along the length of a conveyor frame. The conveyor zones each include driven support rollers that support a product for movement along the length of the conveyor zone. A drive motor is controlled to rotate the support rollers in either a first or second direction to control the movement of the product along the length of the conveyor zone. In some embodiments, multiple conveyor zones can be formed along the length of the conveyor frame such that movement of the product within the zone can be separately controlled based upon the direction of rotation of one or more drive motors. Products can be transferred between the conveyor zones since the spacing of the support rollers along the entire conveyor frame is consistent. The separation of the conveyor zones is created by removing a lower linking gear at the boundary between the conveyor zones. In this manner, the conveyor zones can be created at different locations along the length of the conveyor frame. Each of the individual conveyor zones can have a different length depending upon the number of support rollers and lower linking gears in that conveyor zone.

We claim:

1. A zoned roller conveyor for moving a product from an upstream end to a downstream end, comprising:
   a conveyor frame including a first side rail and a second side rail spaced from each other to define a conveyor width, each of the first and second side rails being formed from a combination of an inner extrusion and an outer extrusion that create a gear cavity there between;
   a first conveyor zone defined along the length of the conveyor frame and including a first plurality of support rollers rotatable in both a first direction and a second direction and located along an inner surface of the inner extrusion and outside of the gear cavity of the first and second side rail, each of the first plurality of support rollers being mounted to a first end of a shaft and a second end of the shaft including an upper gear, wherein the upper gear of each of the first plurality of support rollers is located within the gear cavity;
   a first plurality of linking gears positioned within the gear cavity below the first plurality of support rollers and located to mesh with the upper gears of the first plurality of support rollers such that rotation of the first linking gears is transferred to the upper gears through the first plurality of linking gears;
   a first connecting rod extending across the conveyor width to interconnect one of the linking gears mounted to the first side rail to one of the linking gears mounted to the second side rail, wherein the first connecting rod is located below the first plurality of support rollers such that rotation of the linking gear mounted to the first side rail causes rotation of the linking gear mounted to the second side rail;
   a first drive motor operable to rotate the first plurality of support rollers in either the first direction or the second direction;
   a second conveyor zone defined along the length of the conveyor frame and positioned upstream from the first conveyor zone, the second conveyor zone including a second plurality of support rollers located along the inner surface of the inner extrusion and outside of the gear cavity of the first and second side rails, each of the second plurality of support rollers being rotatable in both the first direction and the second direction, each of the second plurality of support rollers being mounted to a first end of a shaft and a second end of the shaft including an upper gear, wherein the upper gear of each of the second plurality of support rollers is located within the gear cavity;
   a second plurality of linking gears positioned within the gear cavity below the second plurality of support rollers and located to mesh with the upper gears of the second plurality of support roller such that rotation of the second linking gears is transferred to the upper gears through the second plurality of linking gears;
   a second connecting rod extending across the conveyor width to interconnect one of the linking gears mounted to the first side rail to one of the linking gears mounted to the second side rail, wherein the second connecting rod is located below the second plurality of support rollers such that rotation of the linking gear mounted to the first side rail causes rotation of the linking gear mounted to the second side rail; and
   a second drive motor operable to rotate the second plurality of support rollers in either the first direction or the second direction,
   wherein the second plurality of linking gears are isolated from the first plurality of linking gears such that the first conveyor zone is isolated from the second conveyor zone.

2. The zoned roller conveyor of claim 1 further comprising a motor controller operatively coupled to both the first drive motor and the second drive motor to control operation of the first and second drive motors.

3. The zoned roller conveyor of claim 1 further comprising a first motor controller operatively coupled to the first drive motor and a second motor controller operatively couple to the second drive motor.

4. The zoned roller conveyor of claim 1 wherein one of the first plurality of linking gears is connected to the first drive motor and one of the second plurality of linking gears is connected to the second drive motor.

5. A zoned roller conveyor for moving a product from an upstream end to a downstream end, comprising:
   a conveyor frame including a first side rail and a second side rail spaced from each other to define a conveyor width, each of the first and second side rails being formed from a combination of an inner extrusion and an outer extrusion that create a gear cavity there between;
   a plurality of conveyor zones defined along a length of the conveyor frame, each of the plurality of conveyor zones comprising:
      a plurality of support rollers, wherein the plurality of support rollers are rotatably mounted one of the first and second side rails, wherein each of the plurality of support rollers is mounted to a first end of a shaft and an upper gear is mounted to a second of the shaft, wherein each of the support rollers is located along an inner surface of the inner extrusion and outside of the gear cavity and the upper gear of each of the plurality of support rollers is located within the gear cavity;
      a plurality of linking gears positioned below the upper gears and positioned within the gear cavity to mesh with at least one of the upper gears such that rotation of the linking gears is transferred to the upper gears within the conveyor zone, wherein the linking gears and upper gears of each of the plurality of conveyor zones are isolated from the linking gears and upper gears of the other conveyor zones;
      a drive motor operable to rotate one of the linking gears in either a first direction or a second direction; and
      a connecting rod extending across the conveyor width to interconnect one of the linking gears mounted to the first side rail to one of the linking gears mounted to the second side rail, wherein the connecting rod is located below the plurality of support rollers such that rotation of the linking gear mounted to the first side rail causes rotation of the linking gear mounted to the second side rail.

6. The zoned roller conveyor of claim 5 wherein the drive motor of each conveyor zone is connected to one of the linking gears in the conveyor zone.

7. The zoned roller conveyor of claim 5 wherein each of the plurality of conveyor zones includes a motor controller operable to control the operation of the drive motor.

8. The zoned roller conveyor of claim 5 further comprising one or more motor controllers, wherein the motor controllers are operable to control operation of the drive motors.

9. The zoned roller conveyor of claim 5 wherein the support rollers are located on an inside of the inner extrusion of the first and second side rails and the upper gears and linking gears are located within the gear cavity of the first and second side rails.

10. The zoned roller conveyor of claim 5 wherein one or more of the plurality of conveyor zones includes a pair of drive motors.

\* \* \* \* \*